United States Patent [19]

Blau, Jr.

[11] 3,811,776
[45] May 21, 1974

[54] GAS ANALYZER
[75] Inventor: Henry H. Blau, Jr., Wayland, Mass.
[73] Assignee: Environmental Research & Technology, Inc., Lexington, Mass.
[22] Filed: Feb. 26, 1973
[21] Appl. No.: 336,078

[52] U.S. Cl............... 356/51, 250/343, 356/204
[51] Int. Cl. ............................................ G01n 21/26
[58] Field of Search ... 356/51, 74, 88, 93, 184–186, 356/188, 195, 201, 204–206; 250/218, 343, 373

[56] References Cited
UNITED STATES PATENTS
2,741,703  4/1956  Mundy............................ 356/51 UX
3,005,097  10/1961  Hummel......................... 250/373 X
3,449,565  6/1969  Barringer........................ 250/373 X
3,744,918  7/1973  Jacobsson....................... 356/74 X OTHER PUBLICATIONS
Goody, Journal of the Optical Society of America, Vol. 50, July 1968, pages 900–908.

Primary Examiner—Ronald L. Wibert
Assistant Examiner—F. L. Evans
Attorney, Agent, or Firm—Schiller & Pandiscio

[57] ABSTRACT

Gas in a sample region is analyzed in a nondispersive system for the presence of a particular gas of interest by cross-correlating the absorption spectra of the sample and a specimen of the gas of interest. Radiation is directed through the sample region and a filter for isolating a narrow band of frequencies within the absorption band of the gas of interest, to a radiation detector. The radiation is passed through cells that provide the total energy transmitted at the line or lines of interest and a reference energy transmitted by a region adjacent to the lines of interest and unaffected by changes in absorption in the sample region. In one embodiment this is accomplished by passing the radiation from the filter in rapid succession through three cells typically containing, respectively, an inert gas, the gas of interest at a pressure of about one atmosphere and the gas of interest at approximately two atmospheres pressure, to produce three signals which are normalized by ratioing with three comparable signals taken at the same times by transmitting part of the radiation passed by the three cells, through a reference gas cell. The normalized signals are then combined by a conventional electronic system to give the fractional absorption of the gas of interest in the sample region. An interferometer containing in one leg, a cell containing the gas of interest at a pressure of about two atmospheres, may be located in the radiation path between the cells and the detector.

17 Claims, 13 Drawing Figures

PATENTED MAY 21 1974          3,811,776

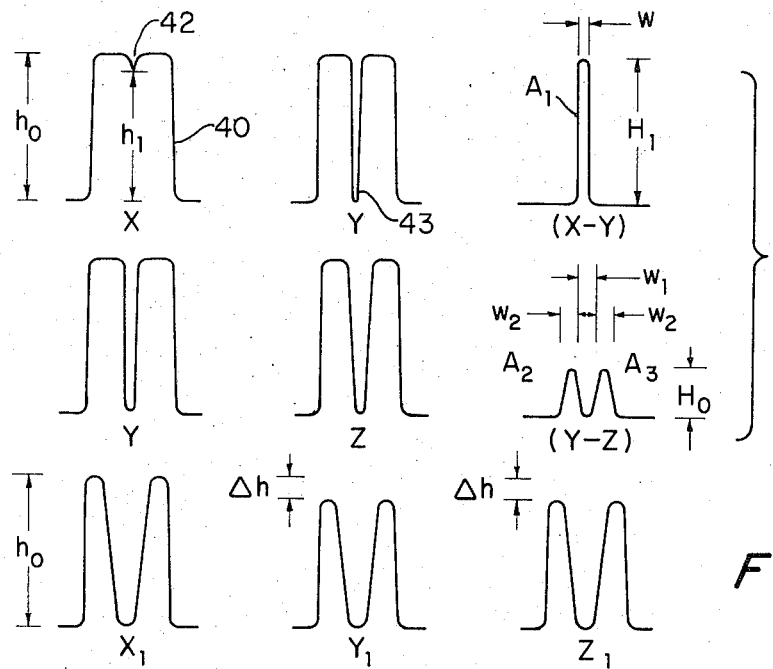
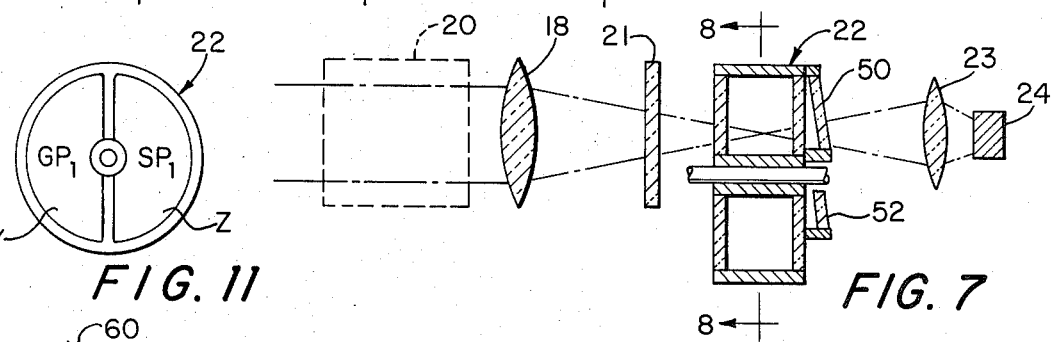
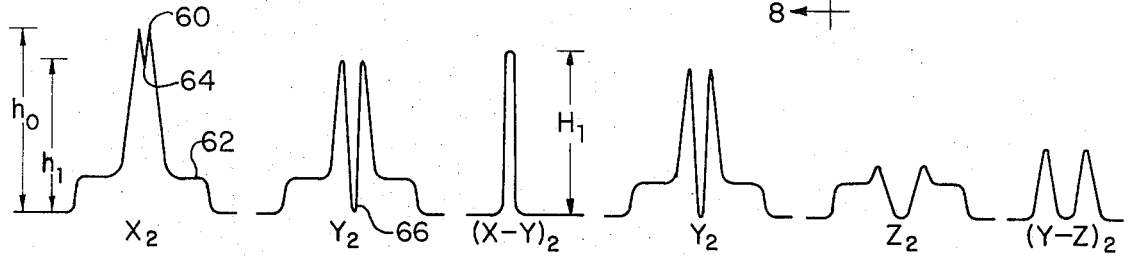
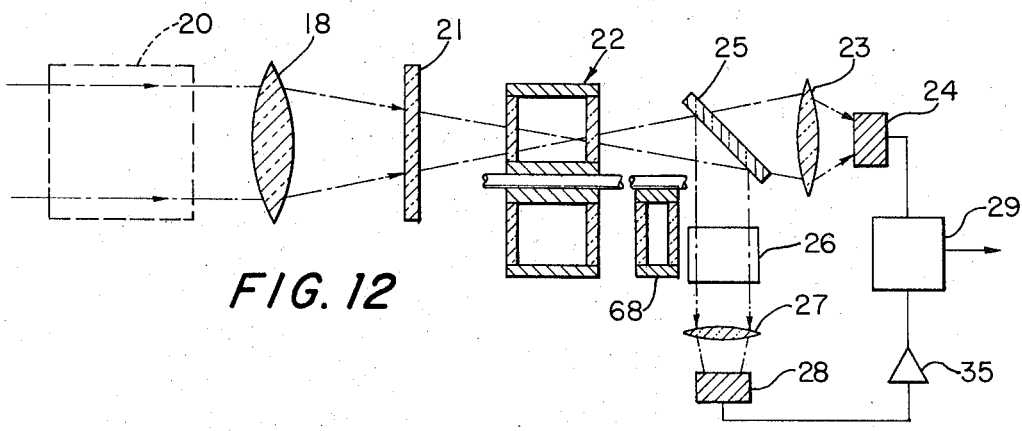

GAS ANALYZER

The present invention is concerned with spectroscopic analysis of gases particularly by cross-correlation of the spectra of a specimen of the gas of interest and a sample.

Gas analyzers of the type with which the present invention are concerned find utility in a number of different fields including, for example, air pollution monitoring, the analysis of gases passing through flues or stacks in connection with combustion control, as well as air pollutant control, in such disparate fields as planetary, astronomy and meteorology.

The operation of cross-correlating, spectroscopic systems are based on the fact that most gases have a characteristic absorption spectrum comprising a large number of narrow, discrete spectral lines. The presence and quantity of a particular gas in a sample region, such as the ambient atmosphere, a flue, stack, or a contained sample, can be determined by measuring the cross-correlation between absorption over a narrow spectral region in a specimen of the gas of interest and a gas sample. For many gases of interest, useful absorption spectra can be most readily found in the infrared, but in some cases also in the visible and ultraviolet spectral regions.

Dispersive systems involving the correlation between dispersed spectra have been employed. However, since spectral features can be very narrow, practical embodiments usually suffer from the disadvantages attendant upon performing correlations with less than an optimum spectral resolution and from optical inefficiencies necessarily associated with use of narrow slits and collimated light beams.

Nondispersive gas analyzers have been developed, typically incorporating a filter isolating an appropriate narrow spectral region, a selective chopper consisting essentially of a gas cell containing the gas of interest, and an identical cell evacuated or filled with a transparent gas so arranged that the cell containing the absorbing gas and the second cell are alternately in the radiation beam. Such a system selectively chops the spectral lines of the gas of interest and the magnitude of the a-c signal developed by the detector depends on transparency of the gas of interest at the spectral lines. The accuracy and sensitivity of such a system is limited by the impossibility of perfectly balancing the transmissions of the two cells outside of the spectral regions where the gas absorbs, and also due to interferences from the presence of absorbing gases with overlapping spectra or false signals produced by source fluctuations or any other intensity fluctuations more rapid than the rate at which the cells are alternately in the beam.

A nondipersive gas analyzer has been proposed[1](-[1]Goody, R.M., Cross-Correlating Spectrometer, J. Optical of America, 58,900 (July, 1968).), incorporating a nondispersive optical instrument that transmits radiation only at the centers of spectral lines. A typical device of this type is a Michelson interferometer with a cell in one arm containing a specimen of the gas of interest in combination with a filter for isolating a relatively narrow spectral region. If the interferometer is balanced to produce destructive recombination of all frequencies in the spectral region of interest, one may detect the presence of the gas in a sample region through which entering radiation is passed. The accuracy and sensitivity of such a system is limited due to the impossibility of perfectly balancing the interferometer to eliminate leakage, and due also the the above-mentioned interferences resulting from scattering or the presence of other absorbing gases with overlapping spectra.

Objects of the present invention are: to provide a novel and improved gas analysis system somewhat analagous in operation to the foregoing correlation spectrometers but utilizing absorption by the gas of interest and a reference signal derived from transmission of adjacent frequencies to the lines of interest to achieve correlations; to provide such a system in which the reference signal is derived from pressure broadening effects, and to provide such a system in which one obtains greater sensitivity and selectivity by means of high optical efficiency, by optimizing effective dispersion and hence the correlation function, by reducing interferences due to the presence of other absorbing gases with overlapping spectra, by reducing interferences due to scattering and absorption by smoke or aerosol particles in the beam, and by minimizing errors due to source fluctuations or unavoidable instrument instabilities.

Other objects of the invention will, in part, be obvious and will, in part, appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be made to the following detailed description taken in connection with the accompanying drawings wherein.

Figure 1:
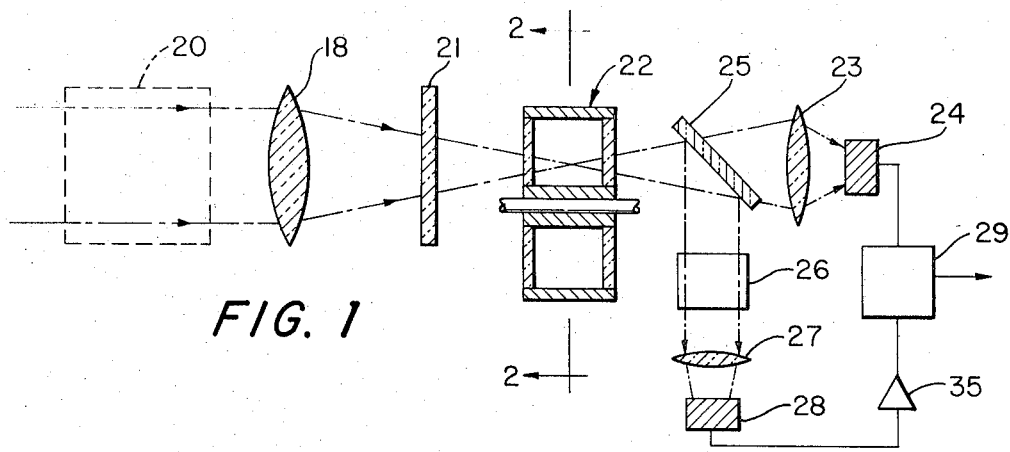
FIG. 1 is a partly schematic, partly cross-sectional view of a gas analysis system embodying the invention.
Figure 2:
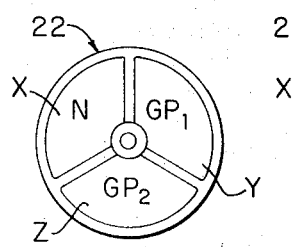
FIG. 2 is a schematic, cross-sectional view of a component of the system of FIG. 1 taken along one line 2—2 of FIG. 1.
Figure 5:
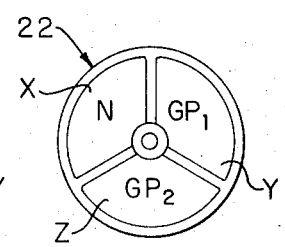
Figure 8:
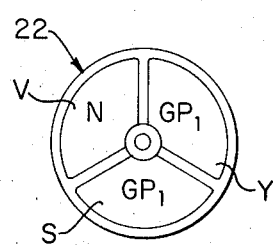
Figure 10:
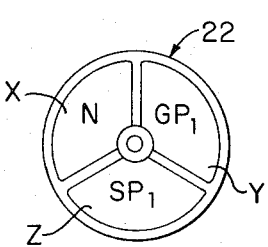
Figure 4:
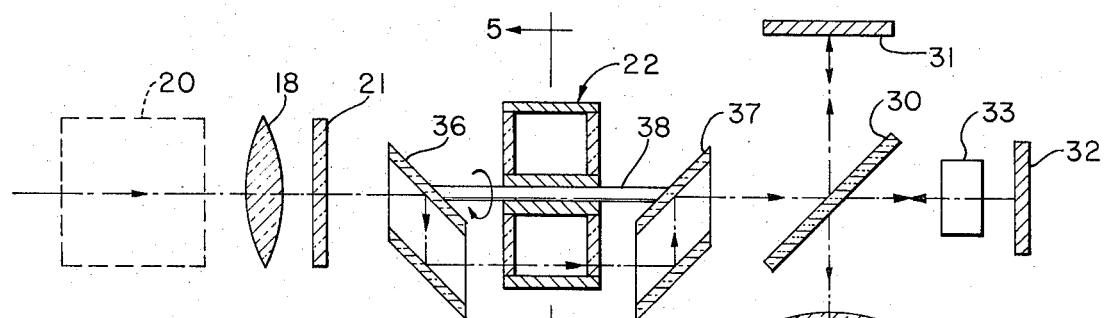
Figure 9:
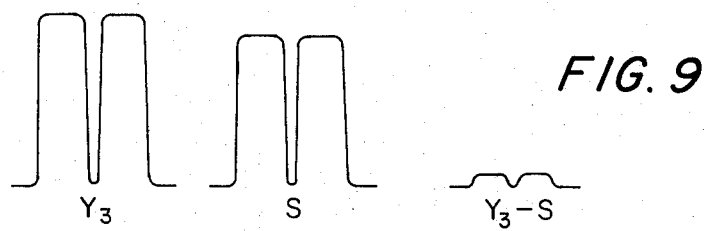

FIGS. 3a and 3b provide a graphical representation of idealized signals produced by the gas analysis system of FIGS. 1 and 2, illustrating the operation of this embodiment including the operations performed on and the significance of the signals produced;

FIG. 4 is a view, similar to FIG. 1, illustrating another version of a gas analysis system embodying the present invention;

FIG. 5 is a schematic, cross-sectional view of a component of FIG. 4, taken substantially along line 5—5 of FIG. 4;

FIG. 6 is a graphical representation, similar to FIG. 3, of the signals produced by the embodiment of FIGS. 4 and 5, illustrating the operation thereof;

FIG. 7 is a schematic cross-sectional view of another embodiment of the present invention;

FIG. 8 is a schematic, cross-sectional view of a component of FIG. 7, taken along line 8—8;

FIG. 9 is a graphical representation similar to FIG. 6, of idealized signal produced by the device of FIG. 7, and FIG. 10 is a cell array useful in yet another variation of the invention, FIG. 11 is a cell array useful in an alternative embodiment of the invention, and FIG. 12 is a view, similar to FIG. 1, illustrating yet another version of a gas analysis system of the present invention.

Generally, the nondispersive gas analysis system of the present invention involves the measurement of the fractional absorption of radiation at a line or lines of interest in a sample zone containing the gas. This is accomplished by providing an optical filter which defines a pass-band in which the lines of interest lie. Means are provided for measuring the energy transmitted ($f_1$) within or under the lines of interest for a unit time and also for measuring the energy transmitted ($F_2$) in a spectral region very closely adjacent the lines of interest for the unit of time, but unaffected by changes in absorption that might occur due to variations in the gas compositions in the sample zone or region. Energy/unit time or flux $F_2$ thus constitutes a reference or background which remains substantially invariant with changes in absorption. Means are then provided for determining the ratio $F_2-F_1/F_2$ which will be shown to be a measure of the fractional absorption.

A first embodiment of a specific nondispersive gas analysis system embodying the invention is illustrated in FIGS. 1 and 2 of the drawings. This system utilizes pressure broadening to provide the reference signals corresponding to transmission in narrow spectral intervals adjacent to and at either side of an absorption line. The basic components of the analyzer include an optical filter 21 capable of isolating a band of frequencies within the absorption band of the gas to be detected. For many gases of particular interest, this band lies in the infrared region of the spectrum and in the preferred embodiment, may be restricted to a wavelength region containing approximately 100 (or less) absorption lines of the subject gas. Any suitable narrow band filter such as an interference filter, grating spectrometer or the like, may be employed.

The analyzer may include its own radiation source (not shown) or receive and operate in response to ambient radiation. It may also include a conventional optical system such as a telescope 18, for causing a beam of radiation passing through a sample region 20 (which contains the gas to be analyzed) to traverse filter 21. The gas to be analyzed or detected may be in the surrounding atmosphere; it may be gas in motion through a particular region such as a chimney or stack; or it can be a confined sample of gas with controlled parameters including dimensions, pressure, temperature, concentration and the like.

A beam of light which has passed through the sample gas 20 and filter 21, is then caused to traverse, alternately and in rapid sequence, a plurality of cells shown as an array 22; and is then directed by a lens 23 to a radiant energy detector 24 such as a thermistor bolometer which is sensitive to infrared radiation.

Cell array 22 is illustrated in FIG. 2 as comprising three radiation-transmitting cells designated X, Y, and Z mounted for rotation in the path of radiation transmitted by the telescope through filter 21. Cell X is empty or filled with a gas N, such as nitrogen, which does not absorb in the spectral region of interest. Cell Y contains the gas G of interest together with a nonabsorbent gas at a total pressure that might typically be about one atmosphere ($P_1$) and at a partial pressure of G sufficient to achieve about 100 percent absorption at the center of the line of interest. The third cell, designated Z, contains gas G plus nonabsorbent gas and is at a total pressure typically of about two atmospheres ($P_2$). The partial pressures of the gases of interest G in cell Z are adjusted to give an area under the absorption lines about twice the area under the absorption lines of the gas in the sample cell Y.

The spectral signals reaching the detector and representing the transmission of each of the three gas cells X, Y, and Z in the spectral region defined by the interference filter are illustrated in FIG. 3A. The idealized transmission through cell X is shown as a signal 40 as having peak amplitude $h_o$ and a dip 42 to a smaller amplitude $h_1$ resulting from absorption by gas G at a sample absorption wavelength. In practice, many lines will be present in the pass-band of the filter, but only one is shown for illustration. With cell Y in the beam, peak amplitude remains at $h_o$ but the transmission at the sample absorption band is reduced to near zero as shown by dip 43 because of the complete absorption at this wavelength by the gas G in cell Y. The transmission signal due to cell Z is similar to signal through cell Y except that the absorption line 43 pressure broadened, as previously indicated, to approximately twice the width of the comparable line of the gas in cell Y.

FIG. 3A also illustrates the spectral characteristics of the difference signals (X-Y) and (Y-Z) which are either computed by hand or determined in known electronic apparatus as will be described later. The former (X-Y) is centered on the line of interest and its envelope encloses a total energy flux of $F_1$ defined by the area under the peak. Similarly, the difference signal used as a reference (Y-Z) is formed of two smaller peaks lying to either side of the line of interest and each enclosing identical energies summing to $F_2$ the total area under both peaks.

To illustrate one way of obtaining the fractional absorption of gas G in the sample region, the pressure $P_1$ and $P_2$ and the partial pressure of gas G in cells Y and Z, respectively, are adjusted so that the difference signals (X-Y) and (Y-Z) are equal when there is no absorption by gas G in the sample region (i.e., $F_1 = F_2$).

Now if there is absorption due to the presence of gas G in region 20, then the energy flux $F_1$ will change by $\Delta F$, but $F_2$ remains the same. One can then define transmission T as the ratio:

$T = F_1/F_2$

Thus, if there is no absorption $F_1 = F_2$ as a precondition and $T = 1$. The fractional absorption $Q$ can thus be expressed:

$Q = 1 - T$
$= 1 - (F_1/F_2)$
$= F_2 - F_1/F_2$ or $Q = (Y-Z) - (X-Y)/(Y-Z)$

The fractional absorption can, of course, still be obtained if $A_1$ is not exactly equal to the sum of $A_2$ and $A_3$ although the algebra will be somewhat different.

It will be apparent that the fractional absorption, which can be related to the quantity of gas G in the sample zone, may now be computed. An important feature of the invention is that the ratio $(Y-Z) - (X-Y)/(Y-Z)$ is not only proportional to the transmission of gas G in the sample region, but is relatively independent of long-term radiation source fluctuations and interferences resulting from particulate scattering and absorption by gases with overlapping spectral features. This independence from interferences is very important in various applications such as air pollution monitoring in which the sample region is ambient air or in stacks or flues in which the presence of other species resulting in absorption and scattering losses, is not subject to control. The relative importance of absorption and scattering losses due to particulate matter in the sample region is minimized because the quantities $(X-Y)$ and $(Y-Z)$ are affected almost identically. This will be true even though the absorption or scattering has some wavelength dependence because the error depends on the curvature of the attenuation versus wavelength curve and in most instances, this can be expected to be very small. The frequency at which the gas cells X, Y and Z are sequentially interposed in the radiation beam will have an effect on the influence of source fluctuations. If the frequency of interposition of cells X, Y, and Z is high enough; i.e., it should be at least greater than the frequency of source fluctuations, then the effects thereof on signals X, Y, and Z will cancel out.

Use of the three cells X, Y, and Z as described above permits comparing transmission at or near line centers to transmission in two narrow spectral intervals adjacent to and either side of each absorption line. The location and width and to some degree shape of the two intervals adjacent to each line can be varied in a predictable way by varying the total pressure and partial pressures of the gases in cells Y and Z. In a like manner, the width and amplitude of the spectral signals $(X-Y)$ in FIG. 3A centered at the absorption line centers can be varied by controlling the total and partial pressures of gases in cell Y. Manipulation of $(X-Y)$ and $(Y-Z)$ in this way permits minimizing interferences and optimizing signal modulation for a given set of circumstances. For example, use of very narrow regions in $(X-Y)$ and $(Y-Z)$ by use of low pressures which reduce broadening effects will help reduce interferences from overlapping absorption bands at the expense of reducing signal but may be useful in producing a larger signal to background interference ratio.

Operation of the gas analyzer requires that $h_o$ in X, Y, and Z be precisely the same during one cycle of rotation of the cells. If the instrument is operated as a remote sensor, and the field of view is scanned rapidly enough, this will not be the case and $h_o$ variations will be encountered, and must be accounted for.

Thus, in a preferred form, an instrument of the invention includes a reference channel formed by introducing a beam splitter such as partially reflecting - partially transmitting mirror 25 into the path of radiation coming from cell array 22. In the path of radiation reflected by mirror 25 is reference cell 26 which contains the same gas mixture at the same total and partial pressures in cell Z. Radiation traversing cell 26 then is focused by lens 27 into radiant energy detector 28 which converts the radiant energy into electrical signals. The spectral signals reaching the reference detector with X, Y, and Z in the beam are respectively shown in FIG. 3B as $X_1$, $Y_1$, and $Z_1$. Differences in $h_o$ that occur with time will produce differences (shown as $\Delta h$ in FIG. 3B) in the reference signal level recorded with cells X, Y and Z sequentially in the beam. These $\Delta h$ signals can be used to normalize the main channel signals corresponding to X, Y and Z. This can be accomplished, for example, by multiplying in known type of electronic multiplier 29 the amplitude of signals X, Y, and Z respectively derived from detector 24 by the inverse of the corresponding reference channel signals $X_1$, $Y_1$ and $Z_1$, recorded simultaneously with signals X, Y and Z and derived from detector 28 and inverter 35. The output of multiplier 29 is of course the normalized signals.

The reference channels signals can be used to account for source fluctuations, fluctuations produced by scattering or absorption due to smoke or aerosol, or changes in $h_o$ produced by scanning the field of view. In addition, reference channel signals can be used to account for instrument-induced errors. The discussion thus far has been for the case where the transmission of cells X, Y, and Z away from the absorption lines due to gas G are identical or very nearly identical. While this can be accomplished by conventional optical means with a very high degree of precision, perfect matching can never be achieved. Further changes can occur in time, for example, due to dirt deposits on the cells. Such changes can obviously be accounted for by use of the reference channel signals as described above.

Note that detector 24 sees in sequence (although three detectors can be used in parallel for simultaneous viewing) the signals X, Y, and Z. These signals may be digitized and stored in timed manner, called from storage and summed algebraically to obtain the requisite difference values $(X-Y)$ and $(Y-Z)$ and then the required ratio set up and computed. A simple analog-to-digital converter and digital computer, all generally shown as computation system 29 and well-known in the art, can readily carry out these simple computations. Alternatively in the simplest form, system 29 need only be a meter indicating the integrated values of $F_1$ and $F_2$, and computation carried out by hand. Obviously, analog electronic or electromechanical systems can also be used to form system 29.

Another embodiment of the gas analyzer of the invention is illustrated in FIGS. 4 and 5. This system requires a lesser degree of accuracy in the measurement of the X, Y, and Z signals, and is similar to that previously shown and described. It differs in that optical means for transmitting radiation only at the center of a spectral region or band are located between the array 22 of gas cells and detector 24. An example of such means is a Michelson interferometer shown simply as including beam splitter 30 and the usual pair of mirrors 31 and 32. A cell 33 containing gas G to be detected together with an inert gas at about the same total and partial gas pressure as in cell Z is located in one of the legs of the interferometer. Mirrors 31 and 32 of the interferometer are adjusted to provide as nearly as possible a 90° phase difference for wavelengths or frequencies in the bandpass of filter 21. Thus, when properly balanced, the interferometer will transmit very little radiation except at wavelengths corresponding to absorption by the gas G to be detected where the balance is disturbed by the presence of gas G (in the sample region).

In the embodiment shown in FIGS. 4 and 5, cell array 22 includes radiation-transmitting cells designated X, Y, and Z. Exactly as in the embodiment of FIG. 1, cell X is empty or filled with inert gas N; cell Y contains at least the gas of interest G together with an inert gas at a total pressure typically of about one atmosphere ($P_1$); and the third cell Z contains gas G plus an inert gas at a total pressure typically of about two atmospheres ($P_2$). Gas G is at sufficient partial pressures in cells Y and Z to effect approximately complete absorption at line centers, and the total and partial gas pressures are such that the area under the lines in Z is twice the area under the lines in Y. Rather than rotate the array 22 of gas-filled cells to alternately interpose the cells in the radiation beam traversing sample region 20 and filter 18, it may be preferable to hold the cells stationary and move an optical system to produce radiation transmission through successive cells. In such a system illustrated in FIGS. 4 and 5, the cell array designated 22 including cells X, Y, and Z, is held stationary. A pair of periscopes (e.g., prisms) 36 and 37 are mounted on a shaft 38 mounted for simultaneous rotation (as shown by the curved arrow) about the axis of the radiation beam for successively directing the path of the radiation beam through cells X, Y, and Z.

As periscopes 36 and 37 are rotated to interpose cells X, Y, and Z, in the radiation beam, detector 24 will receive the typical, idealized spectral signals $X_2$, $Y_2$, and $Z_2$, illustrated in FIG. 6 together with the difference signals $(X-Y)_2$ and $(Y-Z)_2$. It will be noted from FIG. 6 that transmission with cell X in the beam is largely confined to the region represented by peak 60 around where the pressure broadened spectral line of the gas of interest G absorbs. This spectral region is approximately twice as wide as the line width due to the presence gas G in the sample region at a pressure of one atmosphere ($P_1$). However, because the interferometer cannot be balanced perfectly over the spectral region employed, the peak 60 is superimposed on a weak background signal or pedestal 62. Absorption by gas G in the sample region is represented by a dip 64 to a smaller amplitude $h_1$. When cell Y is interposed in the beam, the signal produced is identical to signal X except that transmission at the line center for gas G is reduced to zero as shown at 66 because of the absorption of gas G in cell Y. The total and partial pressures of gases in cell Z is such that the absorption line is pressure broadened to about the same width as the line of gas G in the cell 33 in the interferometer so that the signal Z contains primarily only leakage radiation. The amplitude peak 60 of signals X and Y is replaced by a dip because all radiation at this frequency is absorbed by passing through the gas G at pressure $P_2$ in cell Z.

It now can be seen that the only difference between the X, Y, and Z signals illustrated in FIG. 3 and the $X_2$, $Y_2$, and $Z_2$ signals of FIG. 6, is the presence of the background signal 62 so that the difference signals $(X-Y)$ and $(Y-Z)$ produced by each system represent the same values and once again, the fractional absorption due to the presence of the gas of interest G will be given by the ratio: $(Y-Z) - (X-Y)/(Y-Z)$.

A reference channel arrangement similar to that described in connection with FIG. 1 can also be used.

It will be seen from the foregoing that the gas analysis system of the invention achieves independence from source fluctuations by the rapid, sequential interposition, in the radiation beam directed through the sample region to the detector, of three radiation transmitting cells containing, respectively, an inert gas and the gas of interest at different pressures. Substantially increased accuracy, sensitivity and signal-to-interference ratio are achieved by pressure broadening and by eliminating spurious and background signals resulting from leakage and interference from other absorbing or scattering species such as particulate matter, smoke, water vapor, and noncondensible gases. The absorption by the gas of interest is caused to produce the desired correlation so that the effective dispersion of the system is optimized. The requirements for accuracy in signal detection in order to produce precise results is reduced by interposing between the three cells and the detector, an interferometer having in one leg, a cell containing the gas of interest at a pressure of about two atmospheres.

In place of gas G at pressure $P_2$ in cell Z for the system with no interferometer such as is shown in FIGS. 1 and 2, one can instead employ a second gas S not present in the sample zone but with selected other spectral lines in the spectral region transmitted by filter 18 can be used. A structure using gases G and S is shown in FIG. 10. Minimal overlap of spectral lines of G and S is desirable but not critical. The transmission characteristics of cells Z and Y are matched so that they will each transmit substantially the same intensity of radiation at the unabsorbed portions of the spectral region provided by filter 18, and will each absorb substantially equal amounts of radiation flux. To this end, the total pressure in cell Z is made approximately the same as in cell Y; i.e., $P_1$. The partial pressures of S and G and/or total pressures are adjusted initially so that signals $(X-Y)$ and $(X-Z)$ are equal with no gas G present in the sample space and the fractional absorption of gas G is then determined from the relationship $(X-Z) - (X-Y)/(X-Z)$ or by simple algebra $(Y-Z)/(X-Z)$. In the latter case the numerator will be zero with no absorption by gas G in the sample zone and will take on a maximum value equal to $X-Z$ when there is 100 percent absorption by G in the sample zone.

The latter equation suggests an alternative version of the device using cell-array 22 such as that shown in FIG. 11 in the system shown in FIG. 12. The array of FIG. 11 comprises only two cells, Y and Z, the former including gas at pressure $P_1$ (as in the array of FIG. 10) and cell Z including gas S at pressure $P_1$ (also as in the array of FIG. 10). Thus cells Y and Z are alternately rotatable into the beam from sample region 20 to produce at detector 24 an output signal Y−Z. To obtain a reference value (i.e., a fixed denominator in the ratio defining fractional absorption) third cell 68 is provided containing typically gas G in sufficient amount to provide 100 percent absorption at the spectral lines of the gas within the bandpass of filter 21. Cell 68 is positioned so that it can be periodically introduced into the beam in series with cells Y and Z to produce a signal at detector 24 designated Y'−Z'. The fractional absorption then can be determined from the ratio Y − Z/Y' − Z'. A reference channel is introduced into the embodiment of FIG. 12 by placing both gases S and G into reference cell 26 at the same pressures as those gases are present in cells Y and Z of the arrays of FIG. 10 or FIG. 11. Then the algebraic differences $(X-Z)$ and $(X-Y)$ produced by using the three-cell array of FIG. 10 or the differences $(Y-Z)$ and $(Y'-Z')$ using the two-cell array of FIG. 11, can be ratioed to the reference channel signals obtained, as hereinbefore described in connection with FIG. 1, to normalize the output signals from the system.

For the system with the interferometer such as is shown in Fig. 4, cell 30 in the interferometer can contain both G and S at a total pressure of about $P_1$ with the partial pressures G and S adjusted to give approximately equal transmissions of energy in the spectral regions occupied by lines of G and S respectively. The arrangement of X, Y and Z is as described above. In either case, it should be observed that (X−Z) is a calibrating signal derived from a region directly adjacent the line of interest but which shows no variance with respect to changes of G in the sample zone.

As with the pressure broadened system the total pressure and partial pressures of S and G can be adjusted to optimize signal to interference or background ratios for a given situation. Because of the selective chopping arrangement, some overlap of lines of S and G does not significantly influence results.

In another arrangement, the gas cells as shown in FIGS. 7 and 8 include cell V evacuated or filled with a transparent gas, cell Y containing gas G plus an inert gas at a total pressure $P_1$, and cell S filled identically to cell Y. As shown in FIG. 7, cells V and S are each followed by precision variable radiation broadband attenuators 50 and 52; i.e., a device for uniformly attenuating radiation intensity over a wide range of spectral frequencies. The remainder of the system can be the same as either the configuration of FIG. 1 or FIG. 4.

To operate the system of FIGS. 7 and 8 with no gas G in the sample zone 20, attenuator 50 following cell V is set so that the total energies per unit time or flux in the signals passed by each of cells V and Y are precisely equal. Attenuator 50 can simply be a plane transparent plate which is set to refract and reflect respective portions of an incoming light beam. Now with gas G in zone 20, the idealized spectral signal from cell V as shown in FIG. 9 at V exhibits the usual partial absorption dips as at 34. The signal from cell Y as shown in FIG. 9 as $Y_3$ remains unaffected by the presence of gas G in zone 20 because of its complete absorption of the line of interest due to the presence of gas G in cell Y. The computer difference signal $(V−Y_3)$ shown in FIG. 9 is somewhat different than the previous signals such as $(X−Y)$. This is because the precondition (that when no absorption occurs in sample zone 20, $V=Y_3$) effectively insures that $(V−Y_3)$ is, in effect, the same as $F_2 − F_1$. Now because cells S and Y are identical save for the output attenuator 52 associated with the former, the difference signal $(Y_3 − S)$ is a reference signal which in effect is $F_2$.

Hence, the ratio $V−Y_3/Y_3−S$ is a measure of $F_2−F_1/F_2$ or the same fractional absorption ratio as determined by the other embodiments.

It will be seen that, alternatively, a variation of the embodiment of FIG. 7 can be made employing but two cells, V and Y, and periodically introducing attenuator 52 behind cell Y to obtain the signal S.

The systems using respectively pressure broadening or the second gas S with overlapping spectral features are virtually independent of effects due to changes in the pressures in the cells that would be produced by ambient temperature changes. This is true regardless of whether the lines due to gas G in the cells X, Y and Z are in the linear or square root regions. For the system just described, independence from temperature induced pressure changes occurs only for lines in the linear region.

This requires further explanation. Consider a single spectral line. The total pressure can affect the area encompassed by the single line. When absorption at the line center is nearly complete, the area varies with the square root of the total pressure. Thus, for a fixed amount of gas G, the area will change as $P_1$ or $P_2$ changes. When absorption at line center is quite small, there is no pressure dependence.

Where there is no pressure effect, there is no problem with any of the configurations described. Where there is a pressure effect, the systems of FIGS. 1 and 4 are not sensitive to the pressure induced changes because the effect is the same for the spectral line (signal X − Y) and for the comparison lines (Y−Z) in the pressure broadening case and (X−Z) for the case with gas S. Since we take a ratio, the pressure effect cancels out. This is a real advantage since it gives more freedom in choice of total and partial pressures for optimizing a signal-to-detector noise and signal-to-interference levels.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In an optical, nondispersive absorption analyzer having a filter for passing radiation in a relatively narrow spectral band including absorption lines of a material of interest, a first radiation detector sensitive in said band; means for directing a beam of radiation, which has passed through a sample region containing material to be analyzed, through said filter to said first detector; means for determining total energy flux transmitted to said first detector within said lines of interest; and means for determining total energy flux transmitted to said first detector in said band immediately adjacent to said lines of interest and substantially invariant with changes in absorption at said lines of interest by said material in said sample region, the improvement comprising;

a reference cell for containing said material of interest;

means for transmitting part of said beam, after passage thereof through said sample region and filter, through said reference cell;

a second radiation detector sensitive in said band and disposed in the path of said beam transmitted through said reference cell.

2. An absorption analyzer as defined in claim 1 wherein said means for determining said energy fluxes comprises a first light-transmitting cell capable of substantially nonabsorptively transmitting radiation at said lines of interest, a second light-transmitting cell capable of substantially absorbing all of the radiation within only said lines of interest, and a third light-transmitting cell capable of substantially absorbing all of the radiation with said lines of interest and also only selected portions of said band immediately adjacent to said lines of interest.

3. An absorption analyzer as defined in claim 2 wherein said material in said sample region is a gas of interest, said first detector is adapted to provide signals corresponding to a first fixed fraction of the radiative flux transmitted by each of said light transmitting cells, and said second detector is adapted to provide signals corresponding to a second fixed fraction of the radiative flux transmitted by the combination of each of said light transmitting cells and said reference cell.

4. An absorption analyzer as defined in claim 3 including means for ratioing each signal from said first detector corresponding to transmission by each of said light transmitting cells, with the signals from said second detector corresponding to transmission by the same light transmitting cells thereby to provide normalized signals.

5. An absorption analyzer as defined in claim 4 including means for combining said normalized signals to obtain a signal which corresponds to the fractional absorption of the gas of interest in said sample region.

6. In an optical, nondispersive absorption analyzer having a filter for passing radiation from a sample region in a relatively narrow spectral band including absorption lines of a material of interest, and a radiation detector sensitive in said band, the improvement comprising;
- a first light-transmitting cell capable of substantially non-absorptively transmitting radiation at said lines of interest;
- a second light-transmitting cell capable of substantially absorbing all of the radiation within said lines of interest;
- means for matching the transmission characteristics of said cells within said spectral band so that they can both transmit substantially the same total energy flux of a first beam of radiation of said band, which beam had not been attenuated by absorption at said lines of interest;
- means for directing a second beam of radiation, which has passed through said sample region containing material to be analyzed, through said filter and thence through respective ones of said cells to said detector; and
- means for determining any difference between the energy flux in said second beam as transmitted by said respective cells to said detector.

7. An analyzer as defined in claim 6 wherein said means for matching comprises means for uniformly attenuating over substantially said spectral band, radiation transmitted by said first cell, so that the combination of said first cell and attenuating means passes the same total flux as said second cell alone when no material of interest is in said sample region.

8. An analyzer as defined in claim 7 wherein said means for attenuating can be selectively positioned so as to either attenuate radiation transmitted by said first or said second cell and;
wherein said detector is adapted to generate signals V, Y and S corresponding to the total radiation flux in said second beam transmitted to said detector respectively by a combination of said first cell and said attenuation means, said second cell without said attenuating means, and the combination of said cell and said attenuating means.

9. An analyzer as defined in claim 8 including means for so combining said signals as to obtain the fractional absorption of material of interest in said sample region as expressed by the ratio $V-Y/V-S$.

10. An analyzer defined in claim 6, further including;
a third light transmitting cell capable of substantially absorbing all of the radiation within said lines of interest, and wherein said means for matching comprises first means for uniformly attenuating over substantially said spectral band, radiation transmitted by said first cell, so that the combination of said first cell and first attenuating means passes the same total flux as said second cell alone when no material of interest is in said region;
second means for uniformly attenuating over substantially said spectral band, and having the same transmission characteristics as said first attenuating means, said second attenuating means being associated with said third cell so as to attenuate radiation transmitted through said third cell;
said detector being adapted to generate signals V, Y and S corresponding to the total radiation flux in said second beam transmitted to said detector respectively by the combination of said first cell and said first attenuating means, said second cell, and the combination of said third cell and second attenuating means.

11. An analyzer as defined in claim 10 including means for so combining said signals as to obtain the fractional absorption of the material of interest in said sample region as expressed by the ratio $V-Y/V-S$.

12. In an optical, nondispersive absorption analyzer having a filter for passing radiation from a sample region in a relatively narrow spectral band including absorption lines of a material of interest, and a first radiation detector sensitive in said region, the improvement comprising:
- a first light-transmitting cell capable of substantially absorbing all of the radiation within said lines of interest;
- a second light-transmitting cell capable of substantially absorbing radiation within other selected absorption lines within said band;
- means for matching transmission characteristics of said cells within said spectral band so that they will each transmit substantially the same radiation intensities of unabsorbed portions of a beam of radiation in said band, and will each absorb substantially identical amounts of flux from said beam; and
- means for directing said beam of radiation, after passage thereof through a sample region containing material to be analyzed, through said filter and thence through respective ones of said cells to said first detector.

13. An analyzer as defined in claim 12 including a third light-transmitting cell capable of substantially non-absorptively transmitting radiation at said lines of interest and at said other selected lines.

14. An analyzer as defined in claim 13 including means for determining a first difference $(X-Z)$ between the energy flux in said beam as transmitted by said third cell and said second cell and detected by said first detector, a second difference $(X-Y)$ between the energy flux in said beam as transmitted by said third cell and said second cell and detected by said first detector.

15. An analyzer as defined in claim 14 including means for determining the ratio of the difference between said first and second differences with respect to said first difference thereby to determine the fractional absorption provided by said material of interest present in said radiation from said sample region.

16. An analyzer as defined in claim 12 wherein said first cell includes a first material capable of substantially absorbing all of the radiation within said lines of interest, and said second cell includes a second material capable of absorbing radiation within said other selected absorption lines;

said analyzer further including a reference cell for containing a mixture of both said first and second materials;

a second radiation detector sensitive in said band, and means for transmitting part of said beam, after passage thereof through said sample region and said filter through a respective one of said first and second cells and thence through said reference cell to said second detector.

17. An analyzer as defined in claim 16 including means for establishing the ratio of the energy flux in said beam as transmitted by said first cell to said first detector and by said first cell and reference cell to said second detector, means for establishing the ratio of the energy flux in said beam as transmitted by said second cell to said first detector, and by said second cell and reference cell to said second detector, and means for determining any difference between said ratios.

* * * * *